Oct. 18, 1966   C. RIZZUTO   3,279,812
BABY CARRIAGE WHEEL LOWERING MECHANISM
Filed Sept. 8, 1964   2 Sheets-Sheet 1
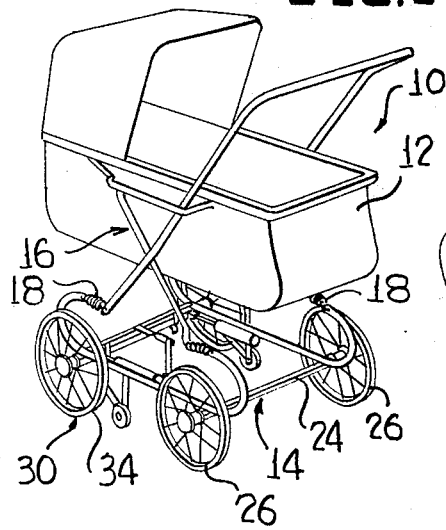
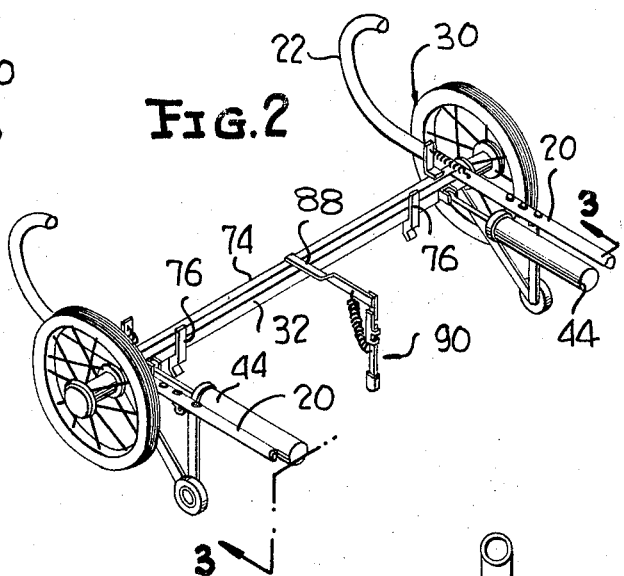
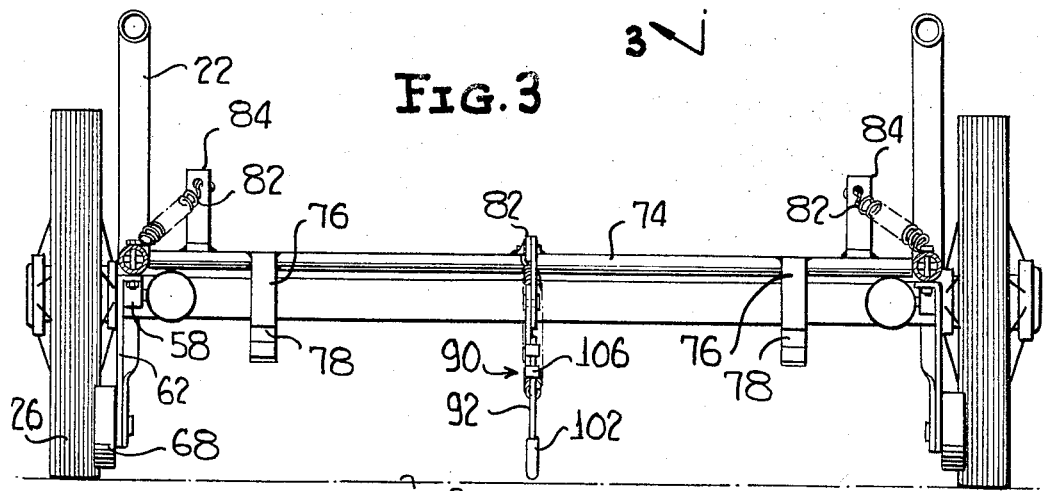
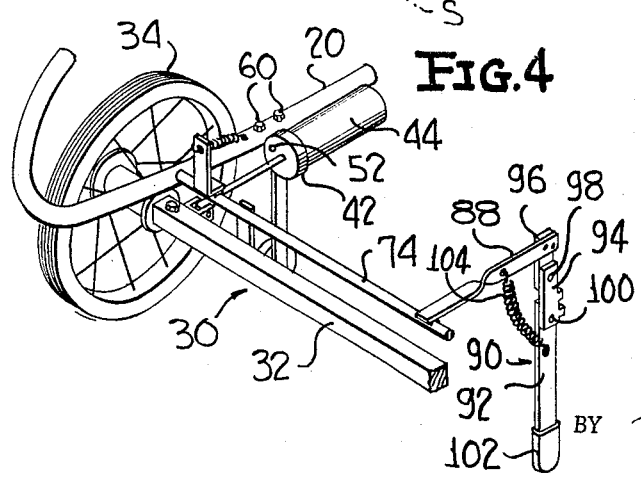
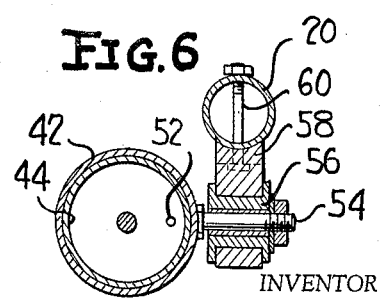
INVENTOR
CHARLES RIZZUTO
BY Shoemaker and Mattare
ATTORNEYS

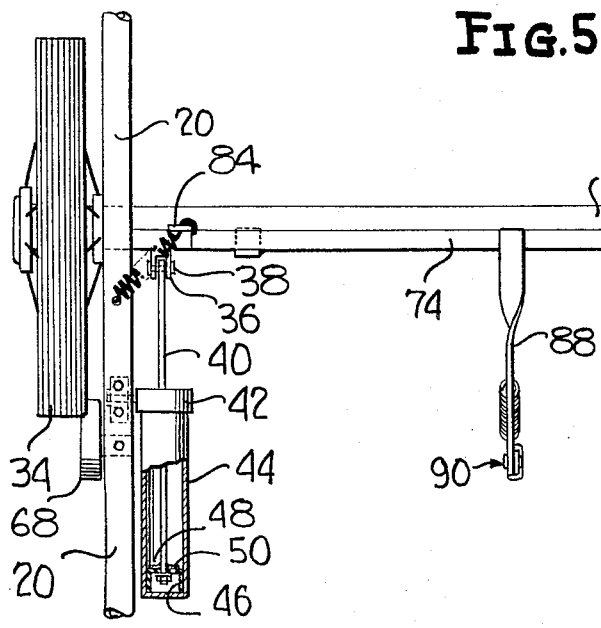
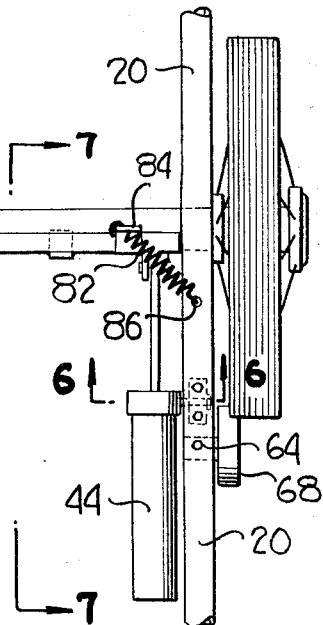
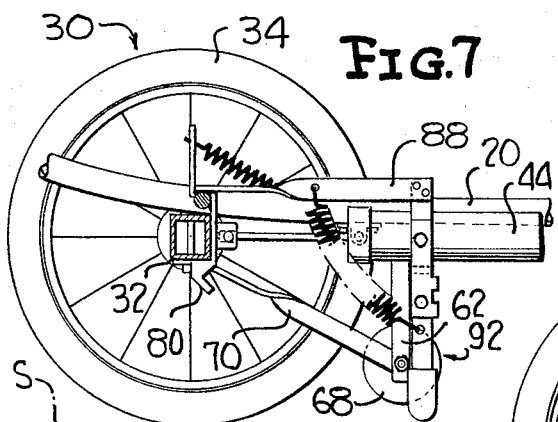
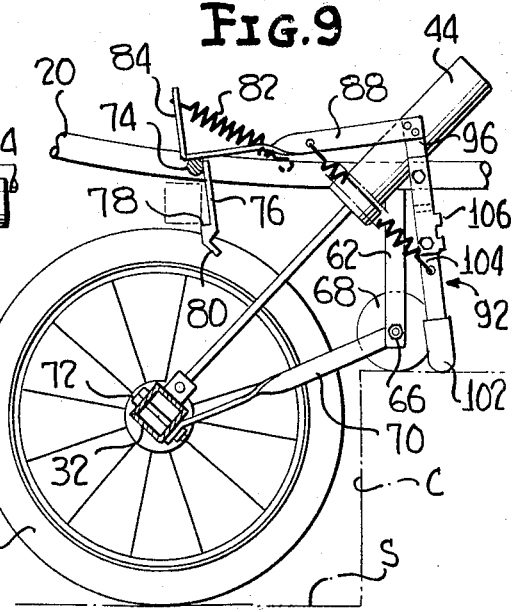
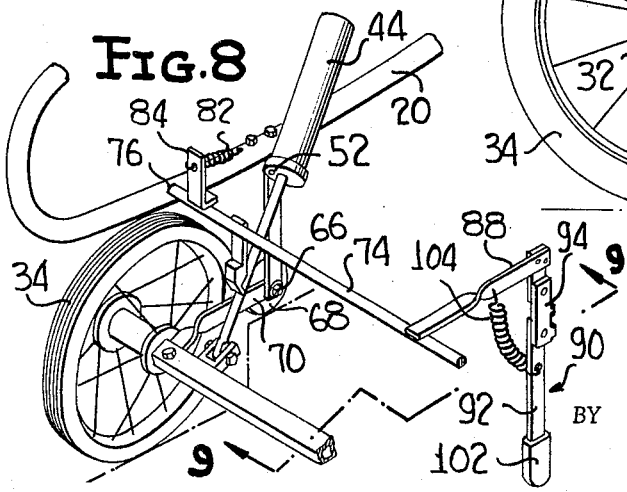

United States Patent Office 3,279,812
Patented Oct. 18, 1966

3,279,812
BABY CARRIAGE WHEEL LOWERING MECHANISM
Charles Rizzuto, Jackson Heights, N.Y., assignor to Anthony Rizzuto, Jackson Heights, N.Y.
Filed Sept. 8, 1964, Ser. No. 394,710
10 Claims. (Cl. 280—5.2)

This invention relates generally to the class of wheeled vehicles and is directed particularly to improvements in the chassis mechanism of a baby carriage or similar vehicle.

An object of the present invention is to provide a carriage structure having a floating front wheel unit operatively coupled with the chassis of the vehicle by a means whereby, when a street crossing is reached, the front wheels will be automatically lowered as they pass across and from the street curb, onto the lower surface, to maintain the vehicle properly supported until the rear wheels have crossed the curb and thereby avoid the usual down tipping or tilting of the front end of the vehicle.

Another object of the invention is to provide a structure of the character above described with auxiliary means for supporting the vehicle chasis at its initial elevation or initial substantially horizontal position while the front wheels are descending to a lower level surface.

Another object of the invention is to provide a mechanism of the above described character wherein the floating front end unit which includes an axle and wheels, is releasably latched to the vehicle chassis for normal operation of the front wheels in association with the rear wheels of the vehicle, with ground engaging means carried rearwardly of the front end unit and operatively connected with such unit, to release the securing means for the axle and wheels of the front end unit as soon as a slight lowering of the front end wheels occurs such as would be the case in passing off from a curb, so as to permit the front end wheels and axle to descend to a lower elevation with respect to the chassis.

It is another object of the invention to provide a mechanism of the above described character which is completely automatic in its operation in that no manual manipulation of any part of the mechanism is required for its operation.

The invention will best understood from a consideration of the following detailed description taken in connection with the accompanying drawings forming a part of the specification and wherein:

FIGURE 1 is a view in perspective of a conventional type of baby carriage showing the mechanism of the present invention operatively connected with the chassis frame.

FIGURE 2 is a perspective view on an enlarged scale of the wheel lowering mechanism showing the same latched in its normal operating position, the view being from the rear looking forwardly.

FIGURE 3 is a transverse section taken substantially on the line 3—3 of FIGURE 2 and on a still larger scale.

FIGURE 4 is a close-up detailed view in perspective of the right hand side of the mechanism looking from the front rearwardly.

FIGURE 5 is a top plan view of the mechanism with portions of the side rails of the chassis and showing one dash pot partially in longitudinal section.

FIGURE 6 is a transverse section, on an enlarged scale, taken substantially on the line 6—6 of FIGURE 5.

FIGURE 7 is a sectional view taken substantially on the line 7—7 of FIGURE 5.

FIGURE 8 is a perspective view of the right hand side of the mechanism, corresponding to FIGURE 4 but showing the floating axle unit, in part and in lowered position.

FIGURE 9 is a sectional view taken substantially on the line 9—9 of FIGURE 8 and on an enlarged scale.

Referring now more particularly to the drawings the numeral 10 generally designates one well known type of baby carriage in association with which the present invention is shown. The carriage illustrated comprises the body 12, the chassis 14, the body frame 16 and the suspension springs 18 which connect the body frame with the chassis side rails 20. The springs 18 are connected to the inwardly turned or curved ends 22 of the chassis rails 20 in the usual conventional manner.

The numeral 24 designates the vehicle rear axle which is secured to the chassis side rails and which carries at its ends outwardly of the side rails 20, the wheels 26.

At the front end of the vehicle the axle, wheels and other parts about to be particularly described form a vertically movable floating front end unit which is generally designated 30.

The floating front end unit embodies the front axle 32 carrying upon its ends the wheels 34. These wheels, of course, are disposed outside of the chassis side rails 20 in tandem with the rear wheels 26.

Adjacent to the inner side of each rail 20, the front axle 32 has fixed to its rear side a bifurcated bracket 36 to which is connected, by means of a pin 38, the outer end of a piston rod 40 which extends through the head or cap 42 of a dash pot cylinder 44. As illustrated, there is a dash pot cylinder or dash pot unit at each side of the chassis frame, which normally lies substantially parallel to the adjacent rail 20.

On the inner end of the piston rod the cup washer 46 is secured to move in the dash pot cylinder and the bottom of the cup washer and the adjacent metal washer 48 of the piston assembly have a bleed aperture 50 therethrough whereby upon inward movement of the piston an air cushion will be established in the dash pot.

The cap 42 is provided with an air escape opening 52 to permit outward movement of the piston.

As shown in FIGURE 6, the cap 42 of the dash pot has rigidly secured thereto the radially outwardly directed pivot pin 54. This pivot pin is mounted in a bearing 56 carried by a bearing block 58 which is secured to the underside of the rail 20 adjacent to the dash pot cylinder, by suitable means such as the pair of mounting bolts and nuts, each of which bolt and nut means is designated 60.

As previously stated, each dash pot is disposed upon the inner side of a rail 20 and lies substantially parallel with the adjacent rail when the front end unit is in normal position, that is, the position in which the wheels are at the same elevation as the rear wheels 26. The pivot pin 54 of each dash pot unit is normally substantially horizontal whereas the dash pot cylinder is adapted to rock on the axis of its supporting pin.

Attached to each side rail 20 adjacent to and rearwardly of the dash pot supporting bearing block 58 is a rigid downwardly projecting arm 62. Any suitable means may be provided for securing the upper end of the arm to the frame side rail such as a bolt, designated 64, which passes through the rail and through an angled end portion of the arm. At its lower end each arm carries an axle pin 66 on which is rotatably mounted a small wheel 68. These wheels 68, one at each side of the chassis frame, function as auxiliary chassis supports to maintain the chassis in normal or substantially horizontal position while the front wheels 34 are moving downwardly away from the chassis.

As shown in FIGURES 3 and 7, when the front wheels 34 are resting upon the same surface as the rear wheels 26, the lowermost portion of the auxiliary wheels will be slightly above such surface. This surface is designated "S" and may be either a pavement surface or a roadway surface.

Each auxiliary wheel axle pin 66 has connected thereto for vertical swinging movement thereon, a forwardly extending brace arm 70 which at its forward end is rigidly secured, by a bolt 72 or other suitable means, to the front axle 32.

The numeral 74 designates a rock shaft which extends transversely of the forward end of the chassis in a position where it overlies the front axle 32 and this shaft is rotatably supported at its ends by a suitable means such as by being disposed in an aperture 76 in the adjacent side rail 20.

Any other suitable means may, of course, be employed for rotatably supporting the rock shaft 74 at its ends.

Adjacent to each end the rock shaft 74 has secured thereto a depending latch finger 76, the lower end of which is formed to provide a detent or upwardly facing hook 78 from which there extends downwardly the camming tongue 80, the camming surface or face of which is directed forwardly and is adapted to be engaged by the axle 32 when the latter moves upwardly, whereby the axle causes the turning of the rock shaft and the rearward swinging of the latch until the axle is in position to engage the hook portion or to be engaged on its underside by the hook portion. The latches thus function to engage the front axle 32 and support it in a raised position with respect to the overlying chassis.

To insure the reverse turning of the rock shaft for engagement of the latches with the axle 32 after the latches have been forced to swing rearwardly and to turn the rock shaft, there are provided the coiled tension springs 82 one end of each of which is attached to the upper end of an upstanding finger 84 rigidly secured to the rock shaft 74, while the other end of the spring is attached in a suitable manner, as at 86 to the adjacent rail 20 at a point rearwardly from the rock shaft 74. These springs are under constant tension so that they will tend to turn the rock shaft in a direction to move the latches to a vertical position. The tension is such, however, that the latches will not be swung past a position where the axle 32 will fail to make latching connection when it is moved from a lowered position to its normal upper position.

Rigidly secured at one end to the rock shaft 74, preferably midway between the ends thereof, is a rearwardly extending rigid rock arm 88.

To the rear end of this arm 88 there is attached the wheel releasing or trip mechanism which is generally designated 90 and which comprises a lower leg portion 92 connected by a link 94 with a rigid downwardly projecting member 96 fixed to the rear end of the rock arm 88. The link 94 has an upper pivot connection 98 with the lower end of the angular extension 96 of the arm 88 and a lower pivotal connection 100 with the upper end of the leg 92.

The lower end of the leg 92 carries a friction tip 102 which is adapted to engage an underlying surface as hereinafter described.

Connecting the leg 92 with the arm 88 is a coil spring 104 which is only stretched or put under tension when the leg 92 is forced to swing rearwardly.

The rear edge of the link 94 carries laterally turned fingers 106 which engage across the rear edge of the leg 92.

In the operation of the present invention the floating front end unit will normally be in the position illustrated in FIGURES 1, 2, 3, 4, 5 and 7 where the axle 32 will be latched to the chassis frame by means of the latches 76. Also, the auxiliary support wheels 68 will be elevated from the underlying surface and the trip mechanasm will have the leg 92 in vertical position or perpendicular to the underlying surface.

When the carriage approaches a street curb as indicated at "C" in FIGURE 9 and the front wheels 34 pass over the edge of the curb and will no longer be supported upon the elevated portion of the surface or top of the curb, the chassis will lower very slightly to close the space between the auxiliary support wheels 68 and the top surface of the curb but prior to this the friction tip or foot 102 of the leg 92, which normally projects somewhat below the lowest part of the auxiliary wheels 68, will be lowered onto the top surface of the curb whereby an upward thrust will be applied to the rock arm 88 as shown in FIGURE 9. This will rock the shaft 74 and disengage the latches 76 from the axle 32 whereupon the weight of the axle and the wheels will cause the front end unit to drop or be lowered to the lower surface "S" or in other words, to the roadway surface. The auxiliary wheels 68 will at the same time, or very closely following the engagement of the friction tip 102 at the top of the curb, come to rest upon the surface of the curb and support the chassis from further downward movement while the front wheels 34 come to rest on the lower surface. The auxiliary wheels 68 will then permit the carriage to be moved forwardly and when they run off the edge of the curb the support will be transferred to the piston rods and the dash pots which, because of the small bleed aperture in each of the piston cups 46, will allow the air to slowly escape from the rear ends of the dash pot cylinders thus maintaining the support of the front end of the carriage until the rear end has been brought up and the rear wheels moved off of the curb in the usual fanner. Due to the linkage connection between the leg 92 and downwardly extending rear end portion of the rock arm 88, the leg will break at the linkage pivots and this will stretch or tension the spring 104 so that when the tip of the leg is free of the curb edge the spring 104 will bring the leg and the upper end portion back into alignment.

When the shaft 74 is rocked by the initial engagement of the trip mechanism for the release of the axle 32 the springs 82 will be stretched or tensioned and thus when the trip mechanism is restored to initial position and the axle 32 is pushed upwardly by the weight of the carriage, the latches 76 will be in position to be re-engaged by the axle and lock the front end unit in its normal elevated position relative to the chassis frame.

While in the preceding description of the invention and in the illustration the invention has been described and shown in operation in connection with the lowering of the front wheels of a carriage when passing over a street curb, the mechanism is also operative in connection with the movement of a carriage down a flight of stairs. In this operation of the mechanism for lowering a carriage down a stairway, it is possible for the carriage to be managed by one person, without help, and in fact it has been demonstrated that the invention can be so lowered down a flight of stairs by a woman using only one hand.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and boundes of the claims or that form their functional as well as conjointly cooperative equivalents, are therefore intended to be embraced by those claims.

I claim:

1. A front wheel lowering mechanism for a wheeled vehicle having a body supporting chassis frame including side rails, a rear axle on the chassis frame and rear wheels on the axle, a floating front end unit including a substantially straight front axle and wheels on the ends thereof, means releasably securing said unit in an elevated position relative to the chassis frame with said front axle having said side rails resting thereon and supported thereby, means operative by engagement with an underlying supporting surface for actuating said releasable securing means to permit said front axle and the wheels to move down away from said rails to position the front wheels upon a supporting surface at a lower elevation when the wheels of the unit move off from a higher supporting surface such as a street curb, and auxiliary means permanently interconnected between the wheel carrying front axle and the side rails of the chassis frame and supporting the front end of the chassis and controlling the movement of the unit wheels while said unit wheels are descending to the said lower elevation surface.

2. The invention according to claim 1, with dash pot cushioning means operatively connected between the chassis frame and said unit axle for yieldingly resisting return movement of said unit to said elevated position by the weight of the chassis and the body thereon.

3. The invention according to claim 1, wherein the first said means comprises latching means supported by the chassis and engaged by the axle of said unit.

4. The invention according to claim 1, wherein the first said means comprises a rock shaft supported between the side rails of the chassis, latching means carried by the shaft and engaged by the axle of said unit, and spring means connected between said shaft and the chassis and urging turning of the shaft in a direction to maintain the said engagement of the axle and latching means.

5. A front wheel lowering mechanism for a wheeled vehicle having a body supporting chassis frame including side rails, a rear axle on the chassis frame and rear wheels on the axle, a floating front end unit including an axle and wheels, brace means rigidly attached to said unit axle and extending rearwardly therefrom, means pivotally coupling the rear ends of said brace means with the chassis for vertical swinging of said unit from a position of elevation relative to the chassis to a lowered position, latching mechanism carried by the chassis for engaging said unit axle and holding the unit in said elevated position, means for actuating said latching mechanism to release the unit axle to permit said unit to swing to the said lowered position, said last means including a ground engaging element made operative upon movement of the unit wheels off of a supporting surface such as a street curb, auxiliary wheel support means adjacent to the rear of said unit wheels for taking over support of the chassis when the unit wheels move off of said supporting surface, and means between the floating unit and the chassis for yieldingly resisting return movement of the unit axle to engagement with the latching mechanism.

6. The invention according to claim 5, wherein the said latching mechanism embodies a rock shaft extending across the chassis between and rotatably engaged at its ends with said side rails and a pair of latching fingers secured to said rock shaft and depending therefrom in a position to establish latching connection with the unit axle when the latter is swung to its elevated position, and the said means for actuating said latching mechanism to release the unit axle embodying an arm secured at one end to the rock shaft and extending rearwardly therefrom and a trip mechanism including a jointed leg attached to the rear end of said arm and extending downwardly and having a ground engaging lower end tip.

7. The invention according to claim 6, wherein said auxiliary wheel support means comprises rigid arms secured to the chassis side rails and extending downwardly and each having an auxiliary wheel pivotally mounted upon the lower end thereof and said means pivotally coupling the rear ends of said brace arms with the chassis comprising said auxiliary wheel support arms, the said brace arms pivoting on the turning axes of the auxiliary support wheels.

8. The invention according to claim 5, wherein the last stated means comprises a pair of dash pots each positioned adjacent to the inner side of a side rail of the chassis frame and each consisting of an elongate cylinder and a piston movable therein and having a rod attached thereto and extending forwardly from the cylinder, each of said piston rods being pivotally attached to the unit axle, the piston of each cylinder having a bleed aperture therein for permitting movement of the piston inwardly in the cylinder, each cylinder having a cap at its forward end, and a pivot pin secured to the forward end of each cylinder and extending laterally and rotatably mounted in a bearing carried by the adjacent side rail.

9. A front wheel lowering mechanism for a wheeled vehicle having a body supporting chassis frame including side rails, a rear axle on the chassis frame and rear wheels on the axle, a floating front end unit including an axle and wheels, and auxiliary support means adjcent to and rearwardly of each unit wheel and comprising a rigid arm secured to a side rail and extending downwardly and an auxiliary wheel of materially smaller diameter than the adjacent unit wheel pivotally supported on the lower end of the arm, a pair of brace arms each having an end pivotally attached to the lower end of an auxiliary wheel carrying arm and extending forwardly and rigidly attached to said unit axle, a dash pot adjacent to the inner side of each side rail at the forward end thereof and including a piston cylinder attached to the adjacent rail by a laterally projecting pivot pin for turning on a pivot perpendicular to the side rail and also including a piston rod having a forward end pivotally attached to the unit axle, means realeasably maintaining said front end unit in an elevated position relative to the chassis frame with the unit axle and said rear axle in a normal substantially horizontal plane, the last said means comprising a rock shaft extending transversely of the chassis and rotatably supported at its ends on the side rails, latch fingers depending from the shaft and engaging beneath said unit axle, and trip means operatively connected to said shaft for turning the latter to release the unit axle from said latch fingers, said auxiliary wheels having their lowermost surfaces slightly above the lowermost surfaces of the unit wheels when the axle is latched in said elevated position and said trip means being made operative upon forward movement of the unit wheels or for the supporting surface, such as a street curb.

10. The invention according to claim 9, wherein said trip means comprises an arm secured to and extending rearwardly from said shaft and an articulated leg having an upper end portion secured to said arm and a lower end portion hinged to the upper end portion and having a lower end tip terminating at an elevation above an underlying supporting surface for the unit wheels but below the lowermost part of the auxiliary wheels, and spring means connecting the shaft to the chassis and biased to turn the shaft toward front axle latching position.

References Cited by the Examiner
UNITED STATES PATENTS

| | | | |
|---|---|---|---|
| 857,696 | 6/1907 | Weinstein | 280—5.28 |
| 998,771 | 7/1911 | Herman et al. | 280—5.2 |

FOREIGN PATENTS

| | | |
|---|---|---|
| 570,806 | 1/1924 | France. |

LEO FRIAGLIA, *Primary Examiner.*